United States Patent
Bojarski et al.

(10) Patent No.: US 11,312,822 B2
(45) Date of Patent: Apr. 26, 2022

(54) REDUCED COLOR POLYCARBONATE COMPOSITIONS, METHODS OF MANUFACTURE, AND ARTICLES THEREOF

(71) Applicant: SABIC GLOBAL TECHNOLOGIES B.V., Bergen op Zoom (NL)

(72) Inventors: Aaron David Bojarski, Cartagena (ES); Jorge A. Garcia Agudo, Cartagena (ES)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 424 days.

(21) Appl. No.: 16/469,216

(22) PCT Filed: Jan. 16, 2018

(86) PCT No.: PCT/IB2018/050268
§ 371 (c)(1),
(2) Date: Jun. 13, 2019

(87) PCT Pub. No.: WO2018/134734
PCT Pub. Date: Jul. 26, 2018

(65) Prior Publication Data
US 2021/0292477 A1 Sep. 23, 2021

(30) Foreign Application Priority Data

Jan. 17, 2017 (EP) .................................. 17382020

(51) Int. Cl.
*C08G 64/06* (2006.01)
*C08G 64/30* (2006.01)
*C08J 5/18* (2006.01)
*C08G 101/00* (2006.01)

(52) U.S. Cl.
CPC .......... *C08G 64/307* (2013.01); *C08G 64/06* (2013.01); *C08J 5/18* (2013.01); *C08G 2101/00* (2013.01); *C08G 2150/00* (2013.01); *C08J 2369/00* (2013.01)

(58) Field of Classification Search
USPC ......................................... 528/196, 198, 307
See application file for complete search history.

(56) References Cited

U.S. PATENT DOCUMENTS

| | | | |
|---|---|---|---|
| 4,240,968 A | 12/1980 | Quinn et al. | |
| 6,410,678 B1 | 6/2002 | Ishida et al. | |
| 6,750,314 B2 | 6/2004 | Miyamoto et al. | |
| 7,371,902 B2 | 5/2008 | Kumar et al. | |
| 2017/0015782 A1 | 1/2017 | Watanabe | |

FOREIGN PATENT DOCUMENTS

| | | |
|---|---|---|
| GB | 1565667 A | 4/1980 |
| JP | 2008239650 * | 10/2008 |
| JP | 2008239650 A | 10/2008 |
| WO | 2011120921 A1 | 10/2011 |
| WO | 2013027165 A1 | 2/2013 |
| WO | 2013175448 A1 | 11/2013 |
| WO | 2014072923 A1 | 5/2014 |
| WO | 2015129640 A1 | 9/2015 |

OTHER PUBLICATIONS

JP2008239650A machine translation, Ryohei Nishihara et al., Carbonic diester composition, method for purifying carbonic diester, and method for producing polycarbonate resin (Year: 2008).*
European Search Report for European Application No. 17382020.0 dated Mar. 28, 2017, 7 pages.
International Search Report for International Application No. PCT/IB2018/050268, International Filing Date Jan. 16, 2018, dated Jun. 7, 2018, 22 pages.
Written Opinion for International Application No. PCT/IB2018/050268, International Filing Date Jan. 16, 2018, dated Jun. 7, 2018, 8 pages.

* cited by examiner

*Primary Examiner* — Terressa Boykin
(74) *Attorney, Agent, or Firm* — Cantor Colburn LLP (57) ABSTRACT

A method of preparing a polycarbonate composition, including: melt polymerizing in a polymerization unit a dihydroxy compound with a diaryl carbonate and removing a stream of color inducing species containing an isopropenyl phenyl-containing group from the polymerization unit, to form a polycarbonate composition, wherein the polycarbonate has a color inducing species containing an isopropenyl phenyl-containing group level below 170 ppm is provided.

14 Claims, 4 Drawing Sheets

REDUCED COLOR POLYCARBONATE COMPOSITIONS, METHODS OF MANUFACTURE, AND ARTICLES THEREOF

CROSS REFERENCE TO RELATED APPLICATIONS

This application is a National Stage application of PCT/IB2018/050268, filed Jan. 16, 2018, which claims the benefit of European Application No. 17382020.0, filed Jan. 17, 2017, both of which are incorporated by reference in their entirety herein.

BACKGROUND

This disclosure relates to polycarbonate compositions, and in particular to reduced color polycarbonate compositions, and methods of manufacture and uses thereof.

Polycarbonates are useful in the manufacture of articles and components for a wide range of applications, from automotive parts to electronic appliances. Polycarbonates are known to color with time and with application of heat.

JP2008239650 describes distilling isopropenyl phenol from a polycarbonate manufacturing process.

There accordingly remains a need for polycarbonate compositions that have reduced color.

SUMMARY

Disclosed herein are methods of preparing polycarbonate compositions, the compositions produced thereby, and articles made from the compositions.

A method of preparing a polycarbonate composition, including: melt polymerizing in a polymerization unit a dihydroxy compound with a diaryl carbonate and removing a stream of color inducing species containing an isopropenyl phenyl-containing group from the polymerization unit, to form a polycarbonate composition, wherein the polycarbonate has a color inducing species containing an isopropenyl phenyl-containing group level below 170 ppm is provided.

A method of preparing a polycarbonate composition, including: melt polymerizing in a polymerization unit a dihydroxy compound, preferably a dihydroxy compound of formula (3):

(3)

wherein $R^a$ and $R^b$ are each independently a halogen, $C_{1-12}$ alkoxy, or $C_{1-12}$ alkyl; p and q are each independently integers of 0 to 4; $X^a$ is a substituted or unsubstituted $C_{3-18}$ cycloalkylidene; a $C_{1-25}$ alkylidene of the formula $-C(R^c)(R^d)-$ wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula $-C(=R^e)-$ wherein $R^e$ is a divalent $C_{1-12}$ hydrocarbon group; with a diaryl carbonate, preferably a diaryl carbonate compound of formula (A)

(A)

wherein each n is independently an integer of 1 to 3 and each $R^i$ is independently a linear or branched, optionally substituted $C_{1-34}$ alkyl, $C_{1-34}$ alkoxy, $C_{5-34}$ cycloalkyl, $C_{7-34}$ alkylaryl, $C_{6-34}$ aryl, a halogen radical, or $-C(=O)OR'$ wherein R' is H, linear or branched $C_{1-34}$ alkyl, $C_{1-34}$ alkoxy, $C_{5-34}$ cycloalkyl, $C_{7-34}$ alkylaryl, or $C_{6-34}$ aryl; and removing a stream of color inducing species containing an isopropenyl phenyl-containing group from the polymerization unit, to form a polycarbonate composition, wherein the polycarbonate has a color inducing species containing an isopropenyl phenyl-containing group level below 170 ppm is provided.

A polycarbonate prepared by the method provided, wherein the polycarbonate has a color inducing species containing an isopropenyl phenyl-containing group concentration of 170 ppm or below, or a yellowness index of less than or equal to 2, as measured by ASTM method D1925, or a difference in yellowness index of less than or equal to 4, after thermal aging of a molded part in a temperature of 135° C. for 1500 hours, as measured by ASTM method D1925, in comparison to the yellowness index before thermal aging is provided.

An article including the polycarbonate composition prepared by the method provided is provided.

A polycarbonate having a molecular weight of 18,000 to 70,000 grams/mole, as measured by gel permeation chromatography (GPC), using a crosslinked styrene-divinylbenzene column and calibrated to bisphenol A homopolycarbonate references; concentration of Fries branching species of less than or equal to 2500 mg/kg, a yellowness index of less than or equal to 2, as measured by ASTM method D1925, or a difference in yellowness index of less than or equal to 4, after thermal aging of a molded part in a temperature of 135° C. for 1500 hours, as measured by ASTM method D1925, in comparison to the yellowness index before thermal aging; prepared by melt transesterifying a dihydroxy compound of formula (3):

(3)

wherein $R^a$ and $R^b$ are each independently a halogen, $C_{1-12}$ alkoxy, or $C_{1-12}$ alkyl; p and q are each independently integers of 0 to 4; $X^a$ is a substituted or unsubstituted $C_{3-18}$ cycloalkylidene; a $C_{1-25}$ alkylidene of the formula $-C(R^c)(R^d)-$ wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula $-C(=R^e)-$ wherein $R^e$ is a divalent $C_{1-12}$ hydrocarbon group; with a diaryl carbonate compound of formula (A)

wherein each n is independently an integer of 1 to 3 and each $R^i$ is independently a linear or branched, optionally substituted $C_{1-34}$ alkyl, $C_{1-34}$ alkoxy, $C_{5-34}$ cycloalkyl, $C_{7-34}$ alkylaryl, $C_{6-34}$ aryl, a halogen radical, or —C(=O)OR' wherein R' is H, linear or branched $C_{1-34}$ alkyl, $C_{1-34}$ alkoxy, $C_{5-34}$ cycloalkyl, $C_{7-34}$ alkylaryl, or $C_{6-34}$ aryl in a polymerization unit; and removing a color inducing species containing an isopropenyl phenyl-containing group from the polymerization unit is provided.

The above described and other features are exemplified by the following drawings, detailed description, examples, and claims.

BRIEF DESCRIPTION OF THE DRAWINGS

Referring now to the FIG.s, which are exemplary Aspects, and wherein the like elements are labeled alike.

DETAILED DESCRIPTION

The inventors hereof have discovered a method to form polycarbonate having reduced color upon heat and/or oxygen exposure as compared to polycarbonate not formed using the method. The method includes melt polymerizing in a polymerization unit a dihydroxy compound with a diaryl carbonate compound; and removing a color inducing species containing an isopropenyl phenyl-containing group from the polymerization unit, to form a polycarbonate composition, wherein the polycarbonate has a color inducing species containing an isopropenyl phenyl-containing group level below 170 parts per million by weight (ppm). The polycarbonate formed by the described method can have a color inducing species containing an isopropenyl phenyl-containing group level below 100 ppm. The polycarbonate formed by the described method can have a 40% color inducing species level reduction.

The color inducing species containing an isopropenyl phenyl-containing group can be any species that causes yellowing of the polycarbonate by forming or reacting into a species that absorbs light having a wavelength between 250 and 700 nanometers (nm), preferably between 450 and 500 nm. The color inducing species containing an isopropenyl phenyl-containing group can be an isopropenyl phenol-containing compound, isopropenyl phenol (IPP), an isopropenyl phenol fragment, an isopropenyl phenol dimer, an isopropenyl phenol trimer, an isopropenyl phenol oligomer, a reaction by-product, a reactant impurity, an isopropenyl phenol-phenyl carbonate, or a combination comprising at least one of the foregoing. The color inducing species containing an isopropenyl phenyl-containing group can be an isopropenyl phenol fragment, an isopropenyl phenol dimer, an isopropenyl phenol trimer, an isopropenyl phenol oligomer, an isopropenyl phenol-phenyl carbonate, or a combination comprising at least one of the foregoing. The color inducing species containing an isopropenyl phenyl-containing group can be an isopropenyl phenol fragment, an isopropenyl phenol dimer, an isopropenyl phenol trimer, an isopropenyl phenol oligomer, a reaction by-product, a reactant impurity, an isopropenyl phenol-phenyl carbonate, or a combination comprising at least one of the foregoing. The color inducing species containing an isopropenyl phenyl-containing group can be an isopropenyl phenol dimer, an isopropenyl phenol trimer, an isopropenyl phenol oligomer, an isopropenyl phenol-phenyl carbonate, or a combination comprising at least one of the foregoing. In an aspect, the color inducing species containing an isopropenyl phenyl-containing group has a boiling point higher than that of phenol. In an aspect, the color inducing species containing an isopropenyl phenyl-containing group has a boiling point higher than that of phenol and lower than that of DPC. In an aspect, the color inducing species containing an isopropenyl phenyl-containing group has a boiling point higher than that of DPC. In an aspect, the color inducing species containing an isopropenyl phenyl-containing group comprises an isopropenyl phenol-phenyl carbonate. The color inducing species can contain other species that do not contain an isopropenyl phenyl-containing group. An isopropenyl phenol-phenyl carbonate has a structure where an isopropenyl phenol group is attached to a phenyl carbonate group. One structure of an isopropenyl phenol-phenyl carbonate is shown below.

In an aspect, IPP is attached to a polycarbonate (PC) chain or chain fragment. IPP attached to a PC chain or chain fragment is also an isopropenyl phenol-phenyl carbonate. One structure of IPP attached to part of a PC chain is shown below, where one single BPA unit is shown.

An isopropenyl phenol dimer can occur as different isomers. An isopropenyl phenol dimer can be linear or branched. As an aspect, some linear isopropenyl phenol dimers, trimers, and tetramers are shown below. In an aspect, isopropenyl phenol acts as an end-capper.

Linear dimer 1      Linear dimer 2

IPP trimer 1      IPP trimer 2

IPP tetramer 1

IPP tetramer 2

An isopropenyl phenol dimer can be attached to a PC chain. An isopropenyl phenol dimer and one single BPA unit is shown below, it is understood these structures can be incorporated into a PC chain. In some aspects, an isopropenyl phenyl dimer is bifunctional and can act as end-capper or used as an equivalent to BPA, thus producing copolycarbonates. The larger IPP oligomers are polyfunctional and behave in a similar fashion as IPP dimers, but allow for extra branching.

Due to its molecular formula and structure, the color inducing species containing an isopropenyl phenyl-containing group has a boiling point higher than phenol. The color inducing species containing an isopropenyl phenyl-containing group can be removed from the polymerization system by use of a side draw, use of a purging system, or a combination of the foregoing. In an aspect, heat exposure means a temperature of greater than or equal to 100° C. for a time of greater than or equal to 30 minutes. In an aspect, heat exposure means a temperature of between 120 and 300° C. for 0.5 to 18 hours.

"Polycarbonate" as used herein means a polymer or copolymer having repeating structural carbonate units of formula (1)

$$-R^1-O-\overset{\overset{O}{\|}}{C}-O- \quad (1)$$

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an aspect, p and q is each 0, or p and q is each 1, and $R^a$ and $R^h$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Examples of bisphenol compounds include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Specific dihydroxy compounds include resorcinol, 2,2-bis (4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxyphenyl)-3,3,5-trimethylcyclohexane (isophorone bisphenol).

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to bisphenol A homopolycarbonate references. GPC samples are prepared at a concentration of 1 mg per ml, and are eluted at a flow rate of 1.5 ml per minute. The polycarbonate has flow properties useful for the manufacture of thin articles. Melt volume flow rate (often abbreviated MVR) measures the rate of extrusion of a thermoplastic through an orifice at a prescribed temperature and load. Polycarbonates useful for the formation of thin articles can have an MVR, measured at 300° C./1.2 kg, of 50 to 1 cubic centimeters per 10 minutes (cc/10 min), specifically 30 to 3 cc/10 min. Combinations of polycarbonates of different flow properties can be used to achieve the overall desired flow property.

"Polycarbonates" includes homopolycarbonates (wherein each $R^1$ in the polymer is the same), copolymers comprising different $R^1$ moieties in the carbonate ("copolycarbonates"), and copolymers comprising carbonate units and other types of polymer units, such as ester units or siloxane units.

Polycarbonates can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_1$-$C_{22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt. %. Combinations comprising linear polycarbonates and branched polycarbonates can be used.

The carbonate precursor can be a carbonyl halide, a bishaloformate of a dihydroxy compound, or a diaryl carbonate. The carbonyl halide can be carbonyl bromide or carbonyl chloride (phosgene). The bischloroformate can be the bischloroformate of bisphenol A, hydroquinone, ethylene glycol, neopentyl glycol, or the like. The diaryl carbonate can be a diaryl carbonate of formula (A)

(A)

wherein each n is independently an integer 1 to 3 and each $R^i$ is independently a linear or branched, optionally substituted $C_{1-34}$ alkyl (specifically $C_{1-6}$ alkyl, more specifically $C_{1-4}$ alkyl), $C_{1-34}$ alkoxy (specifically $C_{1-6}$ alkoxy, more specifically $C_{1-4}$ alkoxy), $C_{5-34}$ cycloalkyl, $C_{7-34}$ alkylaryl, $C_{6-34}$ aryl, a halogen (specifically a chlorine), or —C(=O) OR' wherein R' is H, linear or branched $C_{1-34}$ alkyl (specifically $C_{1-6}$ alkyl, more specifically $C_{1-4}$ alkyl), $C_{1-34}$ alkoxy (specifically $C_{1-16}$ alkoxy, specifically $C_{1-4}$ alkoxy), $C_{5-34}$ cycloalkyl, $C_{7-34}$ alkylaryl, or $C_{6-34}$ aryl. In an aspect, the diaryl carbonate is diphenyl carbonate, or a diaryl carbonate wherein one or both aryl groups have an electron-withdrawing substituents, for example bis(4-nitrophenyl) carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate. A molar ratio of diaryl carbonate to dihydroxy compound can be 2:1 to 1:2, or 1.5:1 to 1:1.5, or 1.05:1 to 1:1.05, 1:1.2 to 1.2 to 1, 1:1.08 to 1.08:1, 1.01:1.06 to 1.06:1.01, or 1:1. In an aspect, the molar ratio of the diaryl carbonate to the dihydroxy compound when expressed to three decimal places is 0.996 or less, or 0.962 to 0.996, or 0.968 to 0.996, or 0.971 to 0.994.

Among tertiary amines that can be used as catalysts in interfacial polymerization are aliphatic tertiary amines such as triethylamine and tributylamine, cycloaliphatic tertiary amines such as N,N-diethyl-cyclohexylamine, and aromatic tertiary amines such as N,N-dimethylaniline. Among the phase transfer catalysts that can be used are catalysts of the formula $(R^3)_4Q^+X$, wherein each $R^3$ is the same or different, and is a $C_{1-10}$ alkyl; Q is a nitrogen or phosphorus atom; and X is a halogen atom or a $C_{1-8}$ alkoxy or $C_{6-18}$ aryloxy. Exemplary phase transfer catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, $CH_3(CH_3(CH_2)_3)_3NX$, and $CH_3(CH_3(CH_2)_2)_3NX$, wherein X is $Cl^-$, $Br^-$, a $C_{1-8}$ alkoxy or a $C_{6-18}$ aryloxy. An effective amount of a phase transfer catalyst can be 0.1 to 10 wt %, or 0.5 to 2 wt %, each based on the weight of dihydroxy compound in the phosgenation mixture.

Alternatively, melt processes can be used to make the polycarbonates. In the melt polymerization process, polycarbonates can generally be prepared by co-reacting, in a molten state, a dihydroxy reactant as described above and a diaryl carbonate ester as described above in the presence of a transesterification catalyst. Conditions for melt process are described, for example, in WO2013/027165 and the references cited therein. Catalysts used in the melt polymerization can include an alpha catalyst and a beta catalyst. Alpha catalysts can comprise a source of alkali or alkaline earth ions and are typically more thermally stable and less volatile than beta catalysts. Beta catalysts are typically volatile and degrade at elevated temperatures, and can comprise a transesterification catalyst of the formula $(R^3)_4Q^+X$ as described above. Beta catalysts are therefore preferred for use at early low-temperature polymerization stages. The alpha catalyst can be used in an amount sufficient to provide $1 \times 10^{-2}$ to $1 \times 10^{-8}$ moles, specifically, $1 \times 10^{-4}$ to $1 \times 10^{-7}$ moles of metal per mole of the dihydroxy compounds used. The amount of beta catalyst (e.g., organic ammonium or phosphonium salts) can be $1 \times 10^{-2}$ to $1 \times 10^{-5}$, specifically $1 \times 10^{-3}$ to $1 \times 10^{-4}$ moles per total mole of the dihydroxy compounds in the reaction mixture. Quenching of the transesterification catalysts and any reactive catalysts residues with an acidic compound after polymerization is completed can also be useful in some melt polymerization processes. Among the many quenchers that can be used are alkyl sulfonic esters of the formula $R^8SO_3R^9$ wherein $R^8$ is hydrogen, $C_1$-$C_{12}$ alkyl, $C_6$-$C_{18}$ aryl, or $C_7$-$C_{19}$ alkylaryl, and $R^9$ is $C_1$-$C_{12}$ alkyl, $C_6$-$C_{18}$ aryl, or $C_7$-$C_{19}$ alkylaryl (e.g., benzenesulfonate, p-toluenesulfonate, methylbenzene sulfonate, ethylbenzene sulfonate, n-butyl benzenesulfonate, octyl benzenesulfonate and phenyl benzenesulfonate, methyl p-toluenesulfonate, ethyl p-toluenesulfonate, n-butyl p-toluene sulfonate, octyl p-toluenesulfonate and phenyl p-toluenesulfonate, in particular alkyl tosylates such as n-butyl tosylate.)

An end-capping agent (also referred to as a chain stopper agent or chain terminating agent) can be included during polymerization to provide end groups. The end-capping agent (and thus end groups) are selected based on the desired properties of the polycarbonates. Exemplary end-capping agents are exemplified by monocyclic phenols such as phenol and $C_1$-$C_{22}$ alkyl-substituted phenols such as p-cumyl-phenol, resorcinol monobenzoate, and p- and tertiary-butyl phenol, monoethers of diphenols, such as p-methoxyphenol, and alkyl-substituted phenols with branched chain alkyl substituents having 8 to 9 carbon atoms, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, mono-carboxylic acid chlorides such as benzoyl chloride, $C_1$-$C_{22}$ alkyl-substituted benzoyl chloride, toluoyl chloride, bromobenzoyl chloride, cinnamoyl chloride, and 4-nadimidobenzoyl chloride, polycyclic, mono-carboxylic acid chlorides such as trimellitic anhydride chloride, and naphthoyl chloride, functionalized chlorides of aliphatic monocarboxylic acids, such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of 0.05 to 2.0 wt. %. Combinations comprising linear polycarbonates and branched polycarbonates can be used.

A thermoplastic composition can further include an impact modifier. Examples of impact modifiers include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR), silicone elastomers, styrene-butadiene-styrene (SBS), styrene-butadiene rubber (SBR), styrene-(ethylene-butene)-styrene (SEBS), acrylonitrile-butadiene-styrene (ABS), acrylonitrile-ethylene-propylene-diene-styrene (AES), styrene-isoprene-styrene (SIS), styrene-(ethylene-propylene)-styrene (SEPS), methyl methacrylate-butadiene-styrene (MBS), high rubber graft (HRG), and the like.

An additive composition can be used, comprising one or more additives selected to achieve a desired property, with the proviso that the additive(s) are also selected so as to not significantly adversely affect a desired property of the thermoplastic composition. The additive composition or individual additives can be mixed at a suitable time during the mixing of the components for forming the composition. The additive can be soluble or non-soluble in polycarbonate. The additive composition can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. For example, a combination of a heat stabilizer, mold release agent, and ultraviolet light stabilizer can be used. In general, the additives are used in the amounts generally known to be effective. For example, the total amount of the additive composition (other than any impact modifier, filler, or reinforcing agent) can be 0.001 to 10.0 wt %, or 0.01 to 5 wt %, each based on the total weight of the polymer in the composition.

The compositions, methods, and articles are further illustrated by the following non-limiting examples.

Examples

The testing methods used are provided in Table 1. Unless otherwise specified, the test methods are those in effect as of the filing date of this application.

TABLE 1

| Property | Description (Conditions) | Test | Specimen |
|---|---|---|---|
| YI | X-rite ColorEye 7000A with specular component and UV light included and calculated for D65 illumination | ASTM D1925 | Molded plaque |
| YI after aging | 135° C. for 1500 hours | | Molded plaque |

The inventors hereof have discovered the initial color and the color after aging of polycarbonates (PC) is affected by the amount of color inducing species present. In the examples herein, IPP content is used as an indicator of the occurrence and/or production of color inducing species containing an isopropenyl phenyl-containing group. Therefore, in the examples herein, lower IPP content is associated with lower coloration in the PC.

The inventors have discovered operational changes in the polymerization system that allows production of polycarbonates having lower color than when the operational changes are not made.

Figure 1:
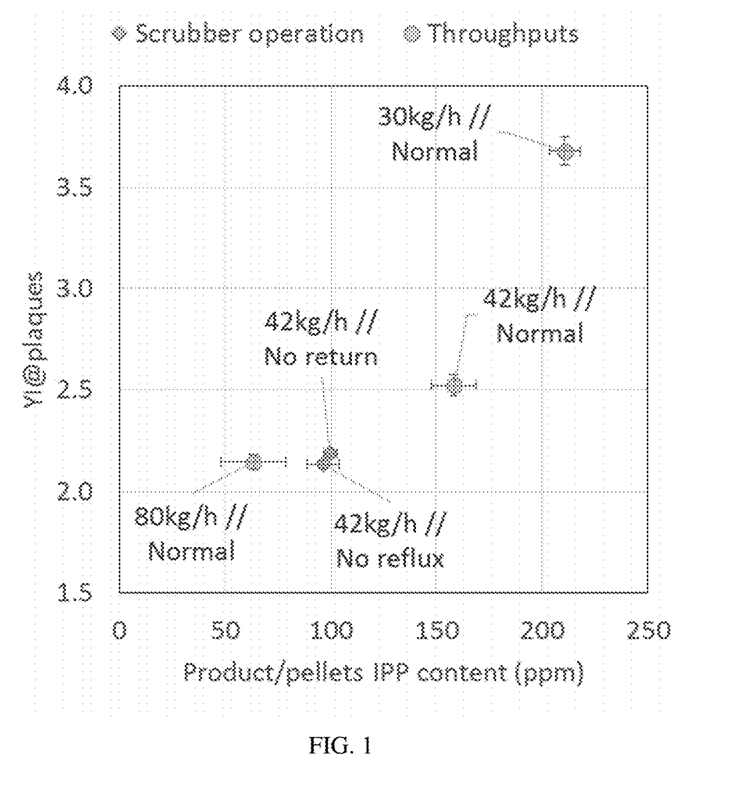
FIG. 1 shows isopropenyl phenol (IPP) levels and yellowness index color for molded plaques of polycarbonate (PC)
Figure 3:
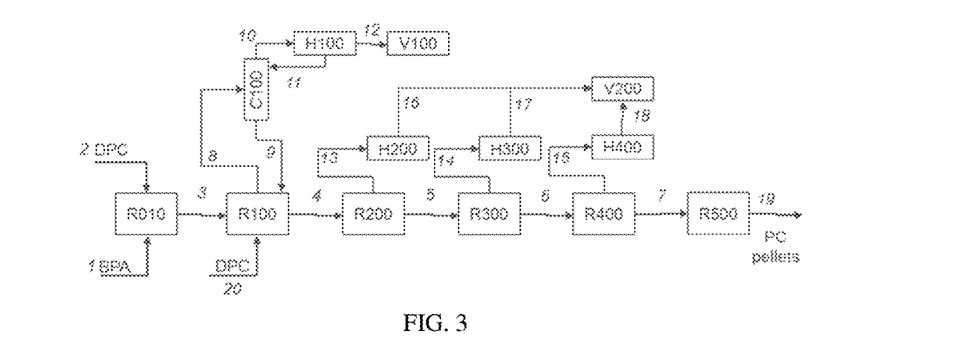
FIG. 3 shows a polymerization system according to Example 1.

FIG. 1 shows IPP levels for PC pellets and their corresponding Yellowness Index (YI) color for molded plaques from different polycarbonate manufacturing processes and throughputs. The formulated polymers were extruded into granulate using an extruder. The granulate was molded into plaques. YI was calculated from the absorption spectrum. In FIG. 1, tributylphosphonium acetate catalyst was used. Throughput values are provided as either 30 kilograms per hour (kg/h), 42 kg/h, or 80 kg/h. "No return" indicates the C100 column bottoms outflow was not returned to the polymerization process stream. "No reflux" means the C100 column was operated but the vapor stream out of R100 was not condensed for recovering of any product. "Normal" indicates no changes in the connectivity as depicted in FIG. 3.

FIG. 1 shows the color of the PC, as measured by YI, is lower when the IPP content is lower. In addition, the throughput of the polymerization system affects the IPP content and color.

Figure 2:
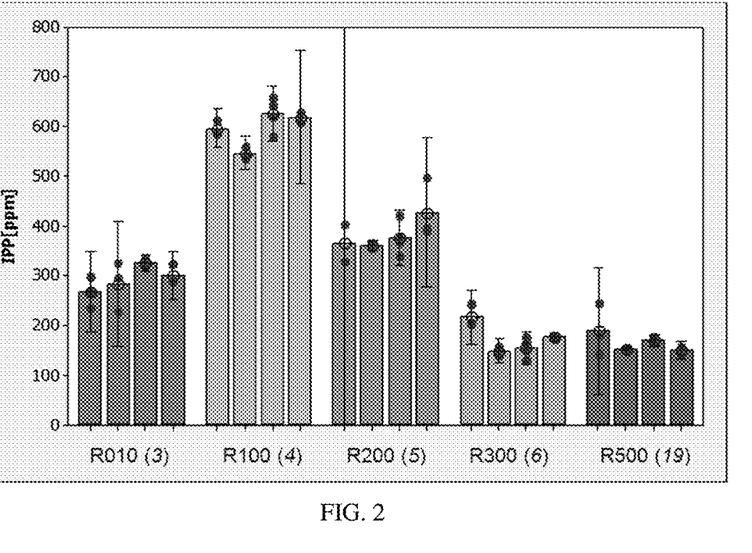
FIG. 2 shows IPP levels at various points in a polymerization system (each bar represents the average of the different samples gathered along steady state operation during at least 24 hours)

IPP levels were measured at various sections of a polycarbonate production process (see FIG. 2 and Table 2). Measurement of IPP levels in the process streams was performed by de-polymerizing the sample (containing PC oligomers/polymer and monomers) by a methanolysis reaction in basic media, thereby measuring IPP that has end-capped PC and IPP that is soluble in the PC matrix. IPP from different species is quantified, namely IPP present as residual soluble species in the PC matrix, and IPP attached to PC or other alcohols (including phenol) via a carbonate group (isopropenyl phenol-phenyl carbonate). The depolymerization was performed by the following procedure: About 1 g of the sample was weighed accurately. It was dissolved in 7.5 ml of tetrahydrofuran (THF) solution containing 10 wt % of potassium hydroxide diluted in methanol. The backbone of the polymer is broken under those conditions, and as such, other carbonates (e.g. DPC) are converted in DMC and their corresponding alcohols. The solution was shaken for 20 min at 40° C. Then, 1.5 ml of pure acetic acid was added to stop the depolymerization/methanolysis reaction. 0.25 g of neutralized solution was taken and diluted 40 times with methanol and the internal standard before injecting into the HPLC system.

The IPP concentration increases along the process from the raw materials, monomer mix up (R010) to the first oligomerization reactor (R100). From the second oligomerization reactor (R200) on and passing through the polymerization sections (R300 and R400) and a finishing extruder (R500), the operating conditions make IPP more volatile and the IPP is assumed to leave the system via the polymerization overheads system. Each bar in FIG. 2 represents a trial, which encompasses at least 24 hours of stable operation. The numbers in parenthesis after the section designation refers to the location of the measured sample, as shown in FIG. 3, for example.

FIG. 3 shows an exemplary polycarbonate production process. The reactants diphenyl carbonate (DPC) and bisphenol acetone (BPA) are mixed in monomer mixing unit (R010). The process stream continues to first oligomerization reactor (R100). A scrubber (C100) operating on top of R100 recycles DPC and BPA back to R100 and removes phenol. A set of equipment (H100, V100) allows for condensing vapor product from C100 and conditioning appropriate distillate and reflux rate for C100. The process stream continues to second oligomerization reactor (R200). The process stream continues to first polymerization reactor (R300), second polymerization reactor (R400), and third polymerization reactor (R500). A set of equipment (H200, H300, H400) allow for condensing or sublimating the vapor streams leaving R200, R300 and R400 to remove mainly phenol and sending those materials to V200.

The IPP level at the monomer mixing stage (R010) is not as high as the IPP level at the first oligomerization reactor (R100) and the IPP level at the second oligomerization reactor (R200) content is lower than the level at R100. The highest IPP content is found in R100. The levels of IPP in the scrubber operating on top of R100 shows that the bottoms stream recycling DPC and BPA back to R100 has a higher IPP content than R100 or the scrubber top stream.

Figure 4:
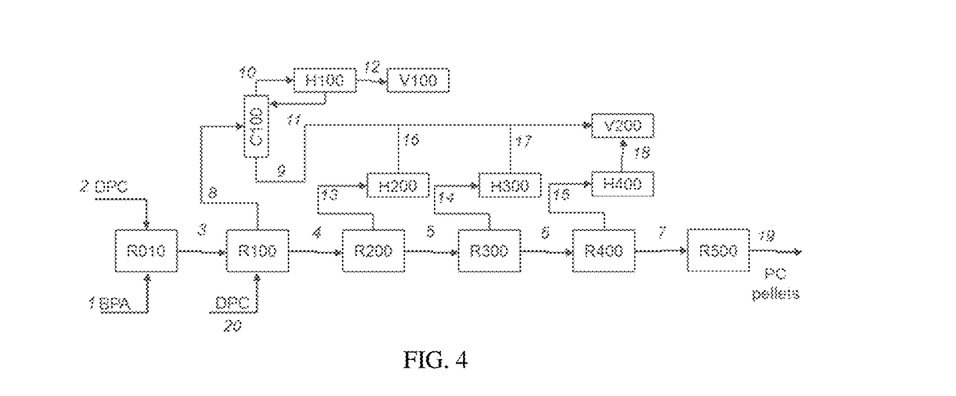
FIG. 4 shows a polymerization system without the scrubber bottoms recycled to the system, according to Example 2.

Therefore, removing IPP from R100 or other process streams will lower the IPP level along the whole process. IPP can be removed by eliminating the flow from the scrubber column C100 back to R100 (shown in FIG. 4), or removing IPP from the scrubber column C100 before the flow from C100 returns back to R100 (shown in FIG. 5), or both. These options were modeled using AspenPlus simulation package and the results provided here.

Two different datasets were generated. One dataset describes operation with a melt PC pilot plant process configuration (Examples 1, 2, and 3) and the other dataset (Example 4, 5, 6, and 7) uses process simulation to include different configurations of process conditions and equipment. Example 1 shows the operation of the pilot plant with the C100 column connected to R100 and is provided as a comparative example for Examples 2 and 3.

In the pilot plant dataset generated for Example 1, the R100 scrubber (C100) column bottoms stream was disconnected from R100. By disconnecting the R100 scrubber from R100, the amount of IPP at the R100 reactor outlet was reduced, and consequently the amount of IPP in the other 3 downstream reactors was reduced (see Table 2, Examples 2 and 3).

Figure 5:
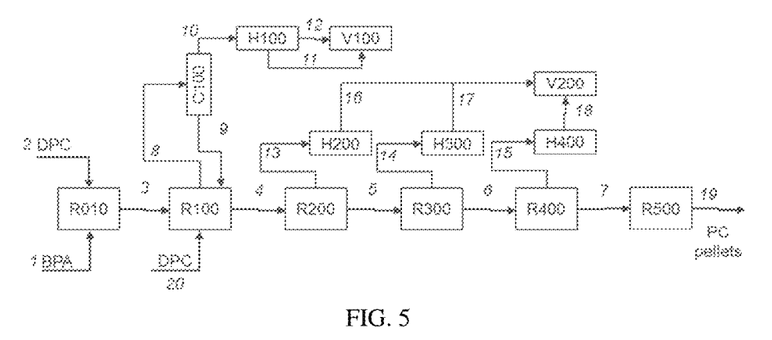
FIG. 5 shows a polymerization system according to Example 3.

Table 2 Example 1 shows the different IPP concentrations observed along the process for the case of operation where scrubber C100 bottoms are returned to R100 (FIG. 3), or for the case (Example 2) where no scrubber bottoms are returned to R100 (see FIG. 4), and also data for Example 3, in which the scrubber reflux was stopped, and consequently no liquid stream was being returned to R100 (FIG. 5). In an aspect, in operation, the configuration shown in FIG. 5 is analogous to FIG. 4.

TABLE 2

IPP (ppm) content of the different streams for the different process conditions tested. The Stream # refers to the streams shown in FIGS. 3 through 7.

| Stream # | Example 1 | Example 2 | Example 3 | Example 4 | Example 5 | Example 6 | Example 7 |
|---|---|---|---|---|---|---|---|
| 1 | 30 | 30 | 30 | N/A | N/A | N/A | N/A |
| 2 | 50 | 50 | 50 | N/A | N/A | N/A | N/A |
| 3 | 300+ | 300+ | 300+ | 223 | 223 | 223 | 223 |
| 4 | 600+ | 230+ | 230+ | 164 | 134 | 105 | 76 |
| 5 | 400+ | 150+ | 150+ | N/A | N/A | N/A | N/A |
| 6 | 170+ | 100+ | 100+ | N/A | N/A | N/A | N/A |
| 7 | N/A | N/A | N/A | N/A | N/A | N/A | N/A |
| 8 | N/A | N/A | N/A | 4364 | 3567 | 2787 | 2028 |
| 9 | 3000 | 2000 | N/A | 13362 | 10859 | 8395 | 5976 |
| 10-11-12 | 40 | 40 | 80+ | 306 | 249 | 194 | 142 |
| 19 | 170+ | 100+ | 100+ | N/A | N/A | N/A | N/A |
| 20 | 50 | 50 | 50 | N/A | N/A | N/A | N/A |
| 21 | N/A | N/A | N/A | 0 | 16142 | 12679 | 9337 |

The reduction of IPP and the observed reduction in yellowness index of molded plaques for the cases where the C100 stream is not returned to R100 are seen in FIG. 1, designated as "no return" or "no reflux" data points.

The data in Examples 1, 2 and 3 provides one change in the production process. However, other process changes can be made to reduce the IPP level. For example, the IPP content in the C100 section can be reduced by using a side-draw (SD) stream. The side draw stream can be located at any position along the scrubber column profile, and can remove different amounts of material. Typically, SD streams are located at the location along the column concentration profile at which the concentration of the species to be withdrawn is the highest. For Example 4 and for IPP, the side draw can be withdrawn at the C100 theoretical fifth stage which shows the largest IPP contents (see FIG. 6) and the SD flow withdrawn in different amounts, as shown in Table 3 for Examples 5, 6 and 7 compared to 4.

Figure 6:
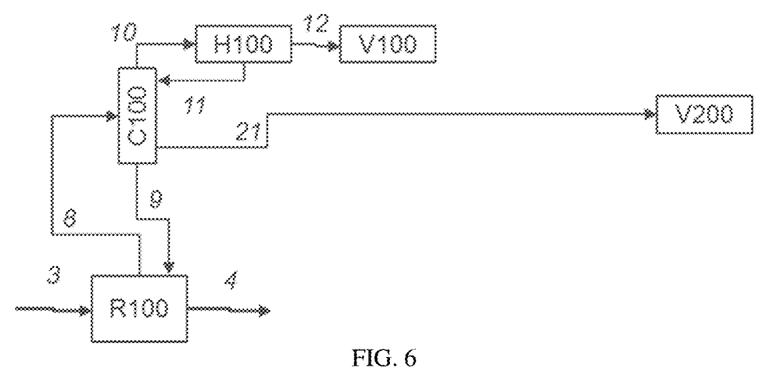
FIG. 6 shows a oligomer reactor (R100) and its scrubber column (C100) with one option for a side draw (SD) operation for Examples 4 to 7.

FIG. 6 shows the IPP concentration of the liquid phase along the column (C100) profile, showing the effect of increasing SD flow for a fixed location along the C100. Table 3 provides the results of the data simulation for these cases. Each case uses different SD flow levels of the side draw and provides IPP content at six positions along the C100 column.

TABLE 3

|  | Example 4 | Example 5 | Example 6 | Example 7 |
|---|---|---|---|---|
| IPP feed in (g/h) | 17.2 | 17.2 | 17.2 | 17.2 |
| R010 out IPP (ppm) | 222.6 | 222.6 | 222.6 | 222.6 |
| Side draw flow (kg/h) | 0.0 | 0.2 | 0.5 | 1.0 |
| Side draw IPP (ppm) | 0.0 | 16142.0 | 12679.0 | 9337.5 |
| R100 to C100 (kg/h) | 42.5 | 42.3 | 41.9 | 41.2 |
| R100 to C100 (ppm IPP) | 4363.6 | 3567.1 | 2786.9 | 2027.6 |
| C100 bottoms (kg/h) | 13.2 | 12.9 | 12.5 | 11.7 |
| C100 bottoms (IPP ppm) | 13361.6 | 10859.0 | 8394.9 | 5975.7 |
| C100 top (kg/h) | 29.3 | 29.2 | 28.9 | 28.5 |
| C100 top (IPP ppm) | 306.0 | 248.9 | 194.3 | 142.4 |
| R100 out flow (kg/h) | 49.7 | 49.7 | 49.7 | 49.6 |
| R100 out (ppm) | 164.2 | 134.1 | 104.6 | 75.9 |

It is seen that using a side draw to withdraw liquid at different amounts at the same location of the C100 column reduces the IPP concentration.

It is noted that Examples 4 to 7 demonstrate the removal of IPP as a color inducing species, but results can also be obtained with (i) the color inducing species present at different concentrations in the R100 inlet, (ii) a different number of stages in C100, (iii) the volatility of the color inducing species to be purged is different than that of IPP itself, which would require different side draw positioning and flow. These examples are intended to be included in the description as if they were individually listed.

A species can also be removed via a liquid side draw stream from a column height at which the desired species to be removed concentration is the highest compared to other height locations, provided the volatility (boiling point) of the color inducing species is known.

Figure 7:
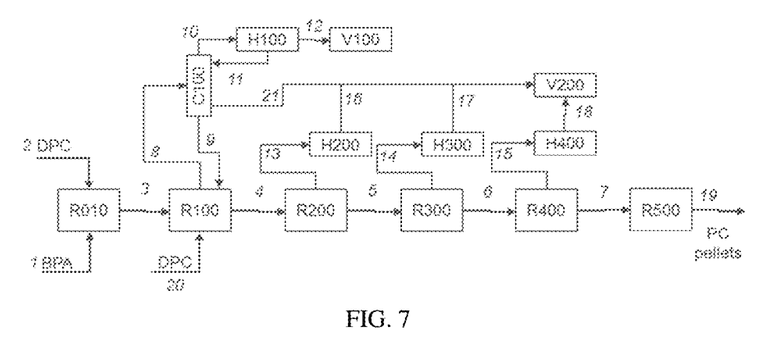
FIG. 7 shows an operational flowsheet of one arrangement of the polymerization system.
Figure 8:
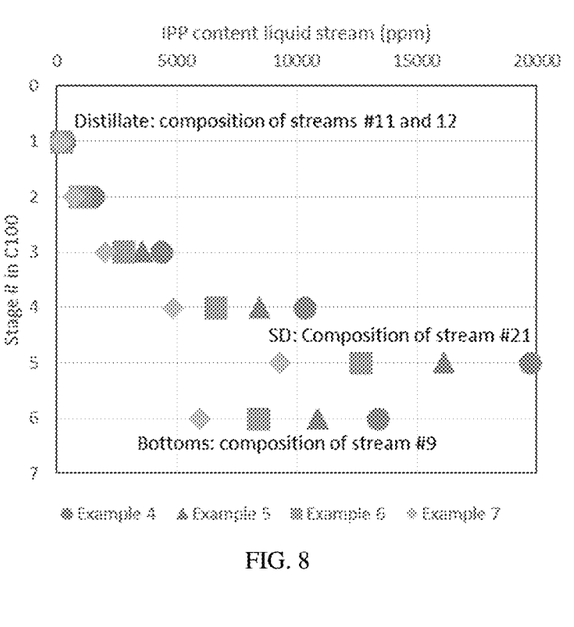
FIG. 8 shows IPP levels at six locations of R100 scrubber (C100) for Examples 4 to 7.

FIG. 7 shows an operational flowsheet, which combines the findings at the different scales from the pilot plant and the scale-up simulation work. The system described in FIG. 7 can be combined with other operations for purifying diphenyl carbonate (not shown). BPA and PC can be purged and optionally recovered from the recovery of the phenol and DPC stream that comes from the oligomerizers and polymerizers. Low boiling (LB) species are those lighter than phenol, medium boilers (MB) are those that have boiling points between those of phenol and DPC, while high boilers (HB) are those heavier than DPC. In an aspect, the species that are lighter than phenol can be easily purged from the process, if a phenol stream is withdrawn from it. In the different aspects discussed here, since LB species are typically recovered with the top phenol stream, LB species will not be further discussed. IPP is a MB and can be separated from the system as shown in FIG. 8. FIG. 8 shows that free IPP returning to the process (via stream #9) can be lowered by increasing the side draw (SD) flow. In the case of an isopropenyl phenol-phenyl carbonate or in the case of isopropenyl phenol dimers, isopropenyl phenol trimers, or isopropenyl phenol oligomers, separation of those species is more complex, since they all are HBs and in some cases close boilers to DPC. One case is that shown in FIG. 4, which purges all material ranging from MB to HB. This reduces the recycle of MBs, DPC, BPA, PC and other HBs back to the process. The return of DPC, BPA and PC oligomers is beneficial to the monomer uses and is desired. Thus, the SD (#21) allows for a selective purge of a group of species with similar boiling point while returning PC monomers (DPC and BPA) and PC oligomers back to R100 via stream #9, for example.

In an aspect, the C100 column recovers phenol that is returned to the system for producing DPC. Phenol is also recovered from the overheads of R200, R300, and R400.

When stream 21 (see FIG. 6, for example) is added, the retrieval of some MBs, DPC, BPA and HBs species is lowered from the bottoms stream in C100. This removes some color inducing species. In an aspect, when isopropenyl phenol-phenyl carbonate species are removed from C100, requiring that SD recover most of DPC, then BPA and PC oligomers can be returned to the system, reducing raw material consumption.

The methods, articles, and polymers are further illustrated by the following aspects, which are non-limiting.

Aspect 1: A method of preparing a polycarbonate composition, comprising:

melt polymerizing in a polymerization unit a dihydroxy compound of formula (3):

(3)

wherein $R^a$ and $R^b$ are each independently a halogen, $C_{1-12}$ alkoxy, or $C_{1-12}$ alkyl; p and q are each independently integers of 0 to 4; $X^a$ is a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group; with a diaryl carbonate compound of formula (A)

(A)

wherein each n is independently an integer of 1 to 3 and each $R^i$ is independently a linear or branched, optionally substituted $C_{1-34}$ alkyl, $C_{1-34}$ alkoxy, $C_{5-34}$ cycloalkyl, $C_{7-34}$ alkylaryl, $C_{6-34}$ aryl, a halogen radical, or —C(=O)OR' wherein R' is H, linear or branched $C_{1-34}$ alkyl, $C_{1-34}$ alkoxy, $C_{5-34}$ cycloalkyl, $C_{7-34}$ alkylaryl, or $C_{6-34}$ aryl; and removing a stream of color inducing species containing an isopropenyl phenyl-containing group from the polymerization unit, to form a polycarbonate composition, wherein the polycarbonate has a color inducing species level less than or equal to 170 ppm.

Aspect 2: The method of Aspect 1, wherein the color inducing species containing an isopropenyl phenyl-containing group level is less than or equal to 100 ppm.

Aspect 3: The method of Aspect 1 or 2, wherein the color inducing species containing an isopropenyl phenyl-containing group comprises isopropenyl phenol, an isopropenyl phenol dimer, an isopropenyl phenol trimer, an isopropenyl phenol oligomer, an isopropenyl phenyl carbonate, or a combination comprising at least one of the foregoing.

Aspect 4: The method of any one or more of the preceding Aspects, wherein the color inducing species containing an isopropenyl phenyl-containing group has a boiling point higher than that of phenol and lower than that of DPC.

Aspect 5: The method of any one or more of Aspects 1 to 3, wherein the color inducing species containing an isopropenyl phenyl-containing group has a boiling point higher than that of DPC.

Aspect 5A: The method of any one or more of the preceding Aspects, wherein the color inducing species containing an isopropenyl phenyl-containing group comprises an isopropenyl phenol-phenyl carbonate.

Aspect 6: The method of any one or more of the preceding Aspects, wherein the dihydroxy compound is bisphenol A and the diaryl carbonate compound is diphenyl carbonate.

Aspect 7: The method of any one or more of the previous Aspects, wherein the polymerization unit comprises an oligomerization section and a polymerization section, and wherein the color inducing species containing an isopropenyl phenyl-containing group is removed from the oligomerization section.

Aspect 8: The method of Aspect 7, wherein the oligomerization section further comprises an extraction column that extracts phenol from the oligomerization section and returns the dihydroxy compound, the diaryl carbonate compound or a mixture thereof to the oligomerization section, the removing comprising removing a color inducing species containing an isopropenyl phenyl-containing group from the extraction column.

Aspect 9: The method of Aspect 8, wherein removing is by a side feed from the extraction column.

Aspect 10: A method of preparing a polycarbonate composition, comprising:
melt polymerizing in a polymerization unit a dihydroxy compound with a diaryl carbonate compound; and removing a stream of color inducing species containing an isopropenyl phenyl-containing group from the polymerization unit, to form a polycarbonate composition, wherein the polycarbonate composition has a color inducing species containing an isopropenyl phenyl-containing group level below 170 ppm, less than or equal to 150 ppm, less than or equal to 125 ppm, or less than or equal to 125 ppm.

Aspect 11: The method of Aspect 10, wherein the isopropenyl phenyl-containing group is isopropenyl phenol, or at least one of an isopropenyl phenol dimer, an isopropenyl phenol trimer, and an isopropenyl phenol oligomer.

Aspect 12: The method of any one or more of the previous Aspects, wherein the color inducing species containing an isopropenyl phenyl-containing group has a boiling point higher than that of phenol.

Aspect 13: A polycarbonate prepared by the method of any of the previous Aspects.

Aspect 14: The polycarbonate of Aspect 13, wherein the polycarbonate has a color inducing species containing an isopropenyl phenyl-containing group concentration of 170 ppm or below, or a yellowness index of less than or equal to 2, as measured by ASTM method D1925, or a difference in yellowness index of less than or equal to 4, after thermal aging of a molded part in a temperature of 135° C. for 1500 hours, as measured by ASTM method D1925, in comparison to the yellowness index before thermal aging.

Aspect 15: The polycarbonate of Aspects 13 or 14, wherein the wherein the polycarbonate has a color inducing species containing an isopropenyl phenyl-containing group concentration of 100 ppm or below.

Aspect 16: The polycarbonate of any one or more of Aspects 13 to 15, concentration of Fries branching species of less than or equal to 2,000 mg/kg (preferably less than or equal to 1,500 mg/kg).

Aspect 17: The polycarbonate of any one or more of Aspects 13 to 16, a difference in yellowness index of less than or equal to 4, after thermal aging of a molded part in a temperature of 135° C. for 1500 hours, as measured by ASTM method D1925, in comparison to the yellowness index before thermal aging Aspect 18: An article comprising the polycarbonate composition of any one or more of Aspects 13 to 17.

Aspect 19: The article of Aspect 18, wherein the article is a sheet, a film, a multilayer sheet, a multilayer film, a molded part, an extruded profile, a fiber, a coated part, or a foam.

Aspect 20: A polycarbonate having a molecular weight of 18,000 to 70,000 grams/mole, as measured by gel permeation chromatography (GPC), using a crosslinked styrene-divinylbenzene column and calibrated to bisphenol A homopolycarbonate references; concentration of Fries branching species of less than or equal to 2,500 mg/kg (preferably 1,500 mg/kg), a yellowness index of less than or equal to 2, as measured by ASTM method D1925, or a difference in yellowness index of less than or equal to 4, after thermal aging of a molded part in a temperature of 135° C. for 1500 hours, as measured by ASTM method D1925, in comparison to the yellowness index before thermal aging; prepared by melt transesterifying a dihydroxy compound of formula (3):

(3)

wherein $R^a$ and $R^b$ are each independently a halogen, $C_{1-12}$ alkoxy, or $C_{1-12}$ alkyl; p and q are each independently integers of 0 to 4; $X^a$ is a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C($R^e$)— wherein $R^e$ is a divalent $C_{1-12}$ hydrocarbon group; with a diaryl carbonate compound of formula (A)

(A)

wherein each n is independently an integer of 1 to 3 and each $R^i$ is independently a linear or branched, optionally substituted $C_{1-34}$ alkyl, $C_{1-34}$ alkoxy, $C_{5-34}$ cycloalkyl, $C_{7-34}$ alkylaryl, $C_{6-34}$ aryl, a halogen radical, or —C(=O)OR' wherein R' is H, linear or branched $C_{1-34}$ alkyl, $C_{1-34}$ alkoxy, $C_{5-34}$ cycloalkyl, $C_{7-34}$ alkylaryl, or $C_{6-34}$ aryl in a polymerization unit; and removing a color inducing species containing an isopropenyl phenyl-containing group from the polymerization unit.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

The singular forms "a," "an," and "the" include plural referents unless the context clearly dictates otherwise. "Or" means "and/or" unless clearly indicated otherwise by context. The modifier "about" used in connection with a quantity is inclusive of the stated value (e.g., "about 25-50 wt %" is a disclosure of "25-50 wt %") and has the meaning dictated by the context (e.g., includes the degree of error associated with measurement of the particular quantity). The notation "±10%" means that the indicated measurement can be from an amount that is minus 10% to an amount that is plus 10% of the stated value.

The terms "bottom", or "top" are used herein, unless otherwise noted, merely for convenience of description, and are not limited to any one position or spatial orientation. The terms "first," "second," and the like, "primary," "secondary," and the like, as used herein do not denote any order, quantity, or importance, but rather are used to distinguish one element from another.

The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group.

The suffix "(s)" is intended to include both the singular and the plural of the term that it modifies, thereby including at least one of that term (e.g., the colorant(s) includes at least one colorants). "Optional" or "optionally" means that the subsequently described event or circumstance may or may not occur, and that the description includes instances where the event occurs and instances where it does not.

Unless defined otherwise, technical and scientific terms used herein have the same meaning as is commonly understood by one of skill in the art to which this disclosure belongs. A "combination" is inclusive of blends, mixtures, alloys, reaction products, and the like.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(═O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., ═O), then two hydrogens on the atom are replaced. Combinations of substituents or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a C2-6 alkanoyl group such as acyl); carboxamido; C1-6 or C1-3 alkyl, cycloalkyl, alkenyl, and alkynyl (including groups having at least one unsaturated linkages and from 2 to 8, or 2 to 6 carbon atoms); C1-6 or C1-3 alkoxys; C6-10 aryloxy such as phenoxy; C1-6 alkylthio; C1-6 or C1-3 alkylsulfinyl; C1-6 or C1-3 alkylsulfonyl; aminodi(C1-6 or C1-3)alkyl; C6-12 aryl having at least one aromatic rings (e.g., phenyl, biphenyl, naphthyl, or the like, each ring either substituted or unsubstituted aromatic); C7-19 arylalkyl having 1 to 3 separate or fused rings and from 6 to 18 ring carbon atoms; or arylalkoxy having 1 to 3 separate or fused rings and from 6 to 18 ring carbon atoms, with benzyloxy being an exemplary arylalkoxy.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments and aspects have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

We claim:

1. A method of preparing a polycarbonate composition, comprising:

melt polymerizing in a polymerization unit a dihydroxy compound of formula (3):

(3)

wherein $R^a$ and $R^b$ are each independently a halogen, $C_{1-12}$ alkoxy, or $C_{1-12}$ alkyl; p and q are each independently integers of 0 to 4; $X^a$ is a substituted or unsubstituted $C_{3-18}$ cycloalkylidene; a $C_{1-25}$ alkylidene of the formula —C($R^c$)($R^d$) wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(═$R^e$)— wherein $R^e$ is a divalent $C_{1-12}$ hydrocarbon group;

with a diaryl carbonate compound of formula (A)

wherein each n is independently an integer of 1 to 3 and each $R^i$ is independently a linear or branched, optionally substituted $C_{1-34}$ alkyl, $C_{1-34}$ alkoxy, $C_{5-34}$ cycloalkyl, $C_{7-34}$ alkylaryl, $C_{6-34}$ aryl, a halogen radical, or —C(=O)OR' wherein R' is H, linear or branched $C_{1-34}$ alkyl, $C_{1-34}$ alkoxy, $C_{5-34}$ cycloalkyl, $C_{7-34}$ alkylaryl, or $C_{6-34}$ aryl; and removing a stream of color inducing species containing an isopropenyl phenyl-containing group from the polymerization unit, to form a polycarbonate composition, wherein the color inducing species containing an isopropenyl phenyl-containing group comprises isopropenyl phenol, an isopropenyl phenol dimer, an isopropenyl phenol trimer, an isopropenyl phenol oligomer, an isopropenyl phenyl carbonate, or a combination comprising at least one of the foregoing;

wherein the polycarbonate composition has a color inducing species containing an isopropenyl phenyl-containing group level less than or equal to 170 ppm, and wherein polycarbonate composition comprises a polycarbonate having a molecular weight of 18,000 to 70,000 grams/mole, as measured by gel permeation chromatography (GPC), using a crosslinked styrene-divinylbenzene column and calibrated to bisphenol A homopolycarbonate references;

concentration of Fries branching species of less than or equal to 2500 mg/kg, a yellowness index of less than or equal to 2, as measured by ASTM method D1925, or a difference in yellowness index of less than or equal to 4, after thermal aging of a molded part in a temperature of 135° C. for 1500 hours, as measured by ASTM method D1925, in comparison to the yellowness index before thermal aging.

2. The method of claim 1, wherein the color inducing species containing an isopropenyl phenyl-containing group level is less than or equal to 100 ppm.

3. The method of claim 1, wherein the color inducing species containing an isopropenyl phenyl-containing group has a boiling point higher than that of phenol and lower than that of diphenyl carbonate.

4. The method of claim 1, wherein the color inducing species containing an isopropenyl phenyl-containing group has a boiling point higher than that of diphenyl carbonate.

5. The method of claim 1, wherein the dihydroxy compound is bisphenol A and the diaryl carbonate compound is diphenyl carbonate.

6. The method of claim 1, wherein the polymerization unit comprises an oligomerization section and a polymerization section, and wherein the color inducing species containing an isopropenyl phenyl-containing group is removed from the oligomerization section.

7. The method of claim 6, wherein the oligomerization section further comprises an extraction column that extracts phenol from the oligomerization section and returns the dihydroxy compound, the diaryl carbonate compound or a mixture thereof, to the oligomerization section, the removing comprising removing a color inducing species containing an isopropenyl phenyl-containing group from the extraction column.

8. The method of claim 7, wherein removing is by a side feed from the extraction column.

9. A polycarbonate having a molecular weight of 18,000 to 70,000 grams/mole, as measured by gel permeation chromatography (GPC), using a crosslinked styrene-divinylbenzene column and calibrated to bisphenol A homopolycarbonate references;

concentration of Fries branching species of less than or equal to 2500 mg/kg, a yellowness index of less than or equal to 2, as measured by ASTM method D1925, or a difference in yellowness index of less than or equal to 4, after thermal aging of a molded part in a temperature of 135° C. for 1500 hours, as measured by ASTM method D1925, in comparison to the yellowness index before thermal aging;

prepared by melt transesterifying a dihydroxy compound of formula (3):

wherein $R^a$ and $R^b$ are each independently a halogen, $C_{1-12}$ alkoxy, or $C_{1-12}$ alkyl; p and q are each independently integers of 0 to 4; $X^a$ is a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group;

with a diaryl carbonate compound of formula (A)

wherein each n is independently an integer of 1 to 3 and each $R^i$ is independently a linear or branched, optionally substituted $C_{1-34}$ alkyl, $C_{1-34}$ alkoxy, $C_{5-34}$ cycloalkyl, $C_{7-34}$ alkylaryl, $C_{6-34}$ aryl, a halogen radical, or —C(=O)OR' wherein R' is H, linear or branched $C_{1-34}$ alkyl, $C_{1-34}$ alkoxy, $C_{5-34}$ cycloalkyl, $C_{7-34}$ alkylaryl, or $C_{6-34}$ aryl in a polymerization unit; and removing a color inducing species containing an isopropenyl phenyl-containing group from the polymerization unit.

10. A process of preparing the polycarbonate of claim 9, wherein the method comprises melt transesterifying the dihydroxy compound with the diaryl carbonate compound; and removing the color inducing species from the polymerization unit.

11. The polycarbonate of claim 9, wherein the polycarbonate has a color inducing species containing an isopropenyl phenyl-containing group concentration of 170 ppm or below.

12. The polycarbonate of claim 11, wherein the polycarbonate has a color inducing species containing an isopropenyl phenyl-containing group concentration of 100 ppm or below.

13. An article comprising the polycarbonate of claim 11.

14. The article of claim 13, wherein the article is a sheet, a film, a multilayer sheet, a multilayer film, a molded part, an extruded profile, a fiber, a coated part, or a foam.

* * * * *